United States Patent
Nohara et al.

(10) Patent No.: US 10,577,455 B2
(45) Date of Patent: Mar. 3, 2020

(54) EPOXY RESIN COMPOSITION, PREPREG FOR FIBER-REINFORCED COMPOSITE MATERIAL, AND FIBER-REINFORCED COMPOSITE MATERIAL

(71) Applicant: Mitsubishi Chemical Corporation, Tokyo (JP)

(72) Inventors: Atsushi Nohara, Tokyo (JP); Yasushi Suzumura, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/034,124

(22) Filed: Jul. 12, 2018

(65) Prior Publication Data

US 2018/0319929 A1 Nov. 8, 2018

Related U.S. Application Data

(63) Continuation of application No. PCT/JP2016/088876, filed on Dec. 27, 2016.

(30) Foreign Application Priority Data

Jan. 19, 2016 (JP) ................ 2016-007708

(51) Int. Cl.
| | |
|---|---|
| *C08J 5/24* | (2006.01) |
| *B32B 27/04* | (2006.01) |
| *B32B 27/26* | (2006.01) |
| *B32B 27/38* | (2006.01) |
| *C08L 63/00* | (2006.01) |
| *C08G 59/30* | (2006.01) |
| *C08G 59/32* | (2006.01) |
| *C08G 59/38* | (2006.01) |
| *C08G 59/40* | (2006.01) |
| *C08G 59/68* | (2006.01) |
| *C08G 59/50* | (2006.01) |
| *C08G 59/14* | (2006.01) |
| *C08G 59/44* | (2006.01) |
| *C08G 59/46* | (2006.01) |
| *C08G 59/60* | (2006.01) |

(52) U.S. Cl.
CPC .......... *C08G 59/3218* (2013.01); *C08G 59/14* (2013.01); *C08G 59/302* (2013.01); *C08G 59/32* (2013.01); *C08G 59/3227* (2013.01); *C08G 59/38* (2013.01); *C08G 59/44* (2013.01); *C08G 59/46* (2013.01); *C08G 59/50* (2013.01); *C08G 59/5073* (2013.01); *C08G 59/60* (2013.01); *C08J 5/24* (2013.01); *C08L 63/00* (2013.01); *C08J 2363/00* (2013.01)

(58) Field of Classification Search
None
See application file for complete search history.

(56) References Cited

U.S. PATENT DOCUMENTS

| | | | |
|---|---|---|---|
| 4,331,582 A * | 5/1982 | Babayan | C08G 59/4064 428/322.2 |
| 4,943,516 A | 7/1990 | Kamayachi et al. | |
| 9,994,697 B2 * | 6/2018 | Fukuhara | C08J 5/24 |
| 10,227,476 B2 * | 3/2019 | Fukuhara | C08J 5/24 |
| 2004/0247882 A1 | 12/2004 | Kouchi et al. | |
| 2011/0319525 A1 * | 12/2011 | Maeda | C08G 59/3218 523/452 |
| 2014/0221530 A1 * | 8/2014 | Zapf | C09J 109/02 523/456 |
| 2014/0235757 A1 | 8/2014 | Fukuhara et al. | |
| 2014/0273693 A1 * | 9/2014 | Fukuhara | C08J 5/24 442/175 |
| 2017/0362376 A1 * | 12/2017 | Hughes | C08J 5/24 |

FOREIGN PATENT DOCUMENTS

| | | |
|---|---|---|
| EP | 2781553 A1 | 9/2014 |
| JP | 01-141904 A | 6/1989 |
| JP | 07-050473 A | 2/1995 |
| JP | 2000-344864 A | 12/2000 |
| JP | 2005-307169 A | 11/2005 |
| JP | 2006-206790 A | 8/2006 |
| JP | 2009-114325 A | 5/2009 |
| JP | 4396274 B2 | 1/2010 |
| JP | 2011-231137 A | 11/2011 |
| JP | 2012-188598 A | 10/2012 |
| JP | 2014-28928 A | 2/2014 |
| JP | 5682838 B2 | 3/2015 |
| WO | 2013/081058 A1 | 6/2013 |
| WO | 2013/157424 A1 | 10/2013 |

OTHER PUBLICATIONS

International Search Report issued in corresponding International Application No. PCT/JP2016/088876 dated Mar. 7, 2017.
Office Action issued in corresponding Japanese Patent Application No. 2017-501412, dated Mar. 27, 2018.
Chen Qi, "Polymer-based Composite Materials", Feb. 28, 2007, pp. 92-93.
Office Action dated Nov. 12, 2019 issued in corresponding Chinese Patent Application No. 201680078322.5.

\* cited by examiner

*Primary Examiner* — Michael J Feely
(74) *Attorney, Agent, or Firm* — Morgan, Lewis & Bockius LLP

(57) ABSTRACT

This epoxy resin composition contains an epoxy resin (A) having at least three glycidyl groups in the molecule, an epoxy resin (B) having at least one sulfur atom in the molecule, and an imidazole compound (C) containing at least one of 2-phenyl-4,5-dihydroxymethyl imidazole and 2-phenyl-4-methyl-5-hydroxymethyl imidazole.

19 Claims, No Drawings

EPOXY RESIN COMPOSITION, PREPREG FOR FIBER-REINFORCED COMPOSITE MATERIAL, AND FIBER-REINFORCED COMPOSITE MATERIAL

This application is a continuation application of International Application No. PCT/JP2016/088876, filed on Dec. 27, 2016, which claims the benefit of priority of the prior Japanese Patent Application No. 2016-007708 filed in Japan on Jan. 19, 2016, the entire contents of which are incorporated herein by reference.

TECHNICAL FIELD

The present invention relates to an epoxy resin composition used for a prepreg for a fiber-reinforced composite material, a prepreg for a fiber-reinforced composite material including the epoxy resin composition, and a fiber-reinforced composite material obtainable by curing the prepreg for a fiber-reinforced composite material.

BACKGROUND ART

Fiber-reinforced composite materials formed from reinforcing fibers and matrix resins are lightweight and have excellent mechanical characteristics, and therefore, fiber-reinforced composite materials are widely used for aerospace applications (aircraft members and the like), automobile applications (automobile members), sports applications (bicycle members and the like), general industrial applications, and the like. A fiber-reinforced composite material is obtained by molding a prepreg for a fiber-reinforced composite material, the prepreg being an intermediate material.

A prepreg is a material formed from reinforcing fibers impregnated with a thermosetting resin or a thermoplastic resin. Regarding the resin for prepreg, thermosetting resins are mainly used from the viewpoint of the heat resistance and the like of the fiber-reinforced composite material. Among them, from the viewpoint of obtaining a fiber-reinforced composite material having excellent heat resistance, excellent elastic modulus, low cure shrinkage, excellent chemical resistance, and the like, epoxy resins are most favorably used. In particular, in connection with the use applications where heat resistance is required, such as aerospace applications and industrial applications, 180° C.-curable epoxy resins are favorably used.

However, general 180° C.-curable epoxy resins require heating at 180° C. for 2 hours or longer for curing. Therefore, there is a problem that the production cost for the fiber-reinforced composite material increases because: (i) the heating furnace used for the molding of a prepreg requires a sufficient heating capability; (ii) the molding time is prolonged; and (iii) subsidiary materials are also required to have heat resistance of the same degree.

Regarding a method for solving this problem, for example, a method of subjecting an epoxy resin composition to primary curing at a low temperature of 80° C. to 140° C., demolding the cured product, and then post-curing the cured product at a high temperature of 180° C. or higher, is known (see Patent Literature 1).

Furthermore, an epoxy resin composition that is rapidly curable within 30 minutes at 150° C. has also been suggested (see Patent Literature 2).

CITATION LIST

Patent Literature

Patent Literature 1: JP 4396274 B2

Patent Literature 1: JP 5682838 B2

SUMMARY OF THE INVENTION

Problem to be Solved by the Invention

However, as described in Patent Literature 1, in the case of a method of combining primary curing at low temperature and post-curing at high temperature, since a two-stage molding and curing process is required, there is a problem that the molding and curing time or the process time becomes longer, and thus the production cost is increased.

Furthermore, in regard to the epoxy resin composition described in Patent Literature 2, it is difficult for the cured product obtainable by heating the composition for 30 minutes at 150° C. to achieve the heat resistance and mechanical characteristics required in the fields of aerospace, automobile, bicycle, and the like.

However, since prepregs are required to have shelf-lives that are long to a certain extent, the epoxy resin composition is also required to have a long pot life.

The present invention provides an epoxy resin composition that has a long pot life despite having low-temperature high-speed curability and also gives a cured product having excellent heat resistance and mechanical characteristics; a prepreg for a fiber-reinforced composite material, the prepreg including the epoxy resin composition; and a fiber-reinforced composite material obtainable from the prepreg for a fiber-reinforced composite material.

Means for Solving Problem

The present invention includes the following embodiments.

[1] An epoxy resin composition including an epoxy resin (A) having at least three glycidyl groups in the molecule; an epoxy resin (B) having at least one sulfur atom in the molecule; and an imidazole compound (C) including at least one of 2-phenyl-4,5-dihydroxymethylimidazole represented by the following Formula (1) and 2-phenyl-4-methyl-5-hydroxymethylimidazole represented by the following Formula (2).

[Chem. 1]

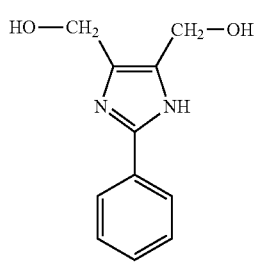

(1)

-continued

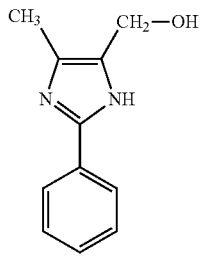

(2)

[2] The epoxy resin composition described in [1], including a reaction product between an epoxy resin and an amine compound having at least one sulfur atom in the molecule, as the component (B).

[3] The epoxy resin composition described in [1] or [2], wherein the content of the component (A) with respect to the total mass of all the epoxy resins included in the epoxy resin composition is 25% to 90% by mass, and the content of the component (B) is 10% to 75% by mass.

[4] The epoxy resin composition described in any one of [1] to [3], including 2-phenyl-4,5-dihydroxymethylimidazole as the component (C).

[5] The epoxy resin composition described in any one of [1] to [4], wherein the glass transition point based on dynamic viscoelasticity measurement of a cured product obtainable by heating the epoxy resin composition for 30 minutes at 150° C. is 180° C. or higher.

[6] The epoxy resin composition described in [5], wherein the glass transition point is 185° C. or higher.

[7] The epoxy resin composition described in [5], wherein the glass transition point is 190° C. or higher.

[8] The epoxy resin composition described in any one of [1] to [7], wherein the pot life of the epoxy resin composition upon storage at 21° C. is four weeks or longer.

[9] The epoxy resin composition described in any one of [1] to [8], wherein the half-value width of the reaction exotherm based on differential scanning calorimetric measurement of epoxy resin composition is 18° C. or lower.

[10] The epoxy resin composition described in any one of [1] to [9], wherein the cure degree based on differential scanning calorimetric measurement of a cured product obtainable by heating the epoxy resin composition for 30 minutes at 150° C. is 94% or higher.

[11] The epoxy resin composition described in any one of [1] to [10], being used in a prepreg for a fiber-reinforced composite material.

[12] A prepreg for a fiber-reinforced composite material, the prepreg including the epoxy resin composition described in any one of [1] to [11], and reinforcing fibers.

[13] A fiber-reinforced composite material, obtainable by curing the prepreg for a fiber-reinforced composite material described in [12].

Effect of the Invention

According to the present invention, an epoxy resin composition that has a long pot life despite having low-temperature high-speed curability and also gives a cured product having excellent heat resistance and mechanical characteristics; a prepreg for a fiber-reinforced composite material, the prepreg including the epoxy resin composition; and a fiber-reinforced composite material obtainable from the prepreg for a fiber-reinforced composite material, can be provided.

MODE(S) FOR CARRYING OUT THE INVENTION

The definitions of the following terms are applicable to both the present specification and the claims.

The term "pot life" means that the time period in which the viscosity stability in a low temperature region for an epoxy resin composition can be maintained is long. Specifically, the glass transition point of the epoxy resin composition is measured using a differential scanning calorimeter (for example, manufactured by TA Instruments, "Q100"), and this is designated as the initial glass transposition point. Subsequently, the epoxy resin composition is stored in an environment at 21° C. and 50 RH %, and the glass transition point of the epoxy resin composition is measured at a frequency of once a week using a differential scanning calorimeter (for example, manufactured by TA Instruments, "Q100"). The time period in which the glass transition point is maintained in the range that does not exceed (initial glass transition point +10° C.) is referred to as "pot life".

The term "shelf life" means a characteristic by which tack or drape of the prepreg in a low temperature region is stabilized.

The "viscosity at 30° C. of the epoxy resin composition" is the viscosity measured using a viscoelasticity analyzer under the conditions including: diameter of parallel plates: 25 mm, plate gap: 0.5 mm, angular velocity: 10 radian/second, stress: 300 Pa, and temperature: 30° C.

The "half-value width of the reaction exotherm of the epoxy resin composition" means the width (° C.) in the X-axis direction of a reaction exotherm peak measured using a differential scanning calorimeter at the position equivalent to a half of the peak height.

The "cure degree of a cured product" is the cure degree obtained by collecting 1 to 10 mg of resin pieces from a cured product obtained by heating an epoxy resin composition for 30 minutes at 150° C., heating the resin pieces up to 300° C. at a heating rate of 10° C./min using a differential scanning calorimeter, measuring the residual heating value, and determining the value by the following Formula (I) from the heating value thus measured.

Cure degree [%]=(Total heating value [J/g] of resin before curing—residual heating value [J/g])/ total heating value [J/g] of resin before curing× 100    (I)

The "glass transition point of a cured product" is the temperature obtained by cutting out a specimen having size of length: 55 mm, width: 12.7 mm, and thickness: 2 mm from a cured product, measuring the storage modulus E' in a bending mode according to ASTM D 7028 using a dynamic viscoelasticity analyzer under the conditions including frequency: 1 Hz and heating rate: 5° C./min, plotting log E' against temperature, and determining the temperature at an intersection point between the tangent line to a flat region before the transition of log E' and the tangent line at the inflection point of the transition region of log E'.

<Epoxy Resin Composition>

The epoxy resin composition of the present invention includes an epoxy resin (A) having at least three glycidyl groups in the molecule (hereinafter, also referred to as "Component (A)"); an epoxy resin (B) having at least one sulfur atom in the molecule (hereinafter, also referred to as "Component (B)"); and an imidazole compound (C) (hereinafter, also referred to as "Component (C)").

The epoxy resin composition of the present invention may include other components in addition to Component (A), Component (B), and Component (C) as necessary, to the extent that the effects of the present invention are not impaired. Examples of the other components include an epoxy resin (D) other than Component (A) and Component (B) (hereinafter, also referred to as "Component (D)"), a curing agent (E) (hereinafter, also referred to as "Component (E)"), and an optional component (F) (hereinafter, also referred to as "Component (F)").

(Component (A))

Component (A) is an epoxy resin having at least three glycidyl groups in the molecule.

Component (A) is a component that imparts the heat resistance required by a cured product of the epoxy resin composition.

Examples of Component (A) include a tetraglycidylamine type epoxy resin, a triglycidylaminophenol type epoxy resin, a triglycidyl ether type epoxy resin, a phenol-novolac type epoxy resin, a cresol-novlac type epoxy resin, and a polyfunctional novolac type epoxy resin.

These may be used singly, or two or more kinds thereof may be used in combination.

Examples of commercially available products of Component (A) include TACTIX (registered trademark) 742 (tris (hydroxyphenyl)methane triglycidyl ether), and ARALDITE (registered trademark) MY720, MY721, MY9663, MY9634, MY9655, MY0500, MY0510, and MY0600 manufactured by Huntsman Advanced Materials LLC; jER (registered trademark) 1032 H60 (polyfunctional novolac-type epoxy resin), jER (registered trademark) 604 and 630 manufactured by Mitsubishi Chemical Corporation; and SUMI-EPDXY (registered trademark) ELM-434 and ELM-100 manufactured by Sumitomo Chemical Company, Limited.

(Component (B))

Component (B) is an epoxy resin having at least one sulfur atom in the molecule. Meanwhile, the epoxy resin corresponding to Component (A) will not be classified as Component (B).

Component (B) is a component imparting excellent heat resistance to the cured product, and examples include a bisphenol S type epoxy resin and an epoxy resin having a thio skeleton. Examples of the thio skeleton include —S— and —SO$_2$—.

Furthermore, regarding Component (B), an epoxy resin derivative having at least one sulfur atom in the molecule can be used, and for example, a reaction product between an epoxy resin and an amine compound having at least one sulfur atom in the molecule can be used. By using Component (B), the curability of the epoxy resin composition at 150° C. or lower can be enhanced, and also, this epoxy resin composition can be imparted with the viscosity necessary for the prepreg use.

Examples of the epoxy resin as a raw material of the reaction product described above include a triglycidyl ether type epoxy resin, a phenol-novolac type epoxy resin, a cresol-novolac type epoxy resin, a polyfunctional novolac type epoxy resin, a biphenyl type epoxy resin, a dicyclopentadiene type epoxy resin, a bisphenol A type epoxy resin, a bisphenol F type epoxy resin, a bisphenol S type epoxy resin, a phenol aralkyl type epoxy resin, and a naphthalene type epoxy resin.

These may be used singly, or two or more kinds thereof may be used in combination.

The amine compound as a raw material of the reaction product described above is not particularly limited as long as the amine compound has at least one sulfur atom in the molecule, and examples include 4,4'-diaminodiphenylsulfone, 3,3'-diaminodiphenylsulfone, and 3,4'-diaminodiphenylsulfone.

These may be used singly, or two or more kinds thereof may be used in combination.

Regarding Component (B), from the viewpoint of having excellent toughness, flexibility, and heat resistance, a reaction product between a bisphenol A type epoxy resin and 4,4'-diaminodiphenylsulfone is preferred, and above all, a reaction product between bisphenol A diglycidyl ether and 4,4'-diaminodiphenylsulfone in particular is more preferred.

Regarding the Component (B) described above, one kind or two or more kinds can be selected and used as appropriate.

(Component (C))

Component (C) is an imidazole compound. An imidazole compound is a compound having an imidazole ring in the structure.

Component (C) is a curing agent or a curing catalyst for an epoxy resin and is a component that has excellent pot life at room temperature and imparts high heat resistance to the cured product.

Component (C) includes at least one of 2-phenyl-4,5-dihydroxymethylimidazole represented by the following Formula (1) (hereinafter, also referred to as "Compound (1)") and 2-phenyl-4-methyl-5-hydroxymethylimidazole represented by the following Formula (2) (hereinafter, also referred to as "Compound (2)"). When Component (C) includes at least one of Compound (1) and Compound (2), the pot life of the epoxy resin composition is extended, and the cured product acquires high heat resistance.

[Chem. 2]

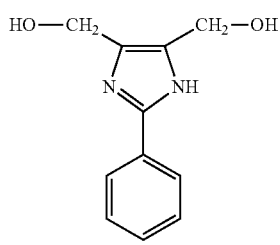

(1)

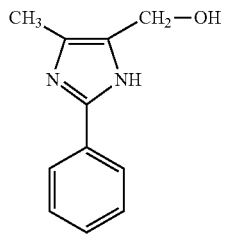

(2)

Regarding Component (C), 2,4-diamino-6-[2'-methylimidazole-(1')]-ethyl-s-triazine, 2,4-diamino-6-[2'-methylimidazole-(1')]-ethyl-s-triazine isocyanuric acid adduct, and a microencapsulated imidazole, and the like may also be used in combination, in addition to Compound (1) or Compound (2) mentioned above.

These may be used singly, or two or more kinds thereof may be used in combination; however, it is particularly preferable to use Compound (1) alone.

Examples of commercially available products of Compound (1) include 2PHZ-PW manufactured by SHIKOKU CHEMICALS CORPORATION.

Examples of commercially available products of Compound (2) include 2P4MHZ-PW manufactured by SHIKOKU CHEMICALS CORPORATION.

Examples of commercially available products of Component (C) other than Compound (1) and Compound (2) include 2MHZ-PW, 2MZA-PW, and 2MA-OK-PW manufactured by SHIKOKU CHEMICALS CORPORATION; and HX3742 manufactured by Asahi Kasei E-materials Corporation.

(Component (D))

Component (D) is an epoxy resin other than epoxy resin (A) and Component (B) (other epoxy resin).

Component (D) is a component that regulates the viscosity of the epoxy resin composition, and the tack and drape obtainable when the epoxy resin composition is used to produce a prepreg, and the like.

Examples of Component (D) include those compounds previously listed as examples of the epoxy resin as a raw material of Component (B). In particular, bisphenol A diglycidyl ether, bisphenol F diglycidyl ether, a monofunctional type epoxy resin, and the like are preferred.

These may be used singly, or two or more kinds thereof may be used in combination.

(Component (E))

Component (E) is a curing agent for an epoxy resin. Meanwhile, any compound corresponding to Component (C) will not be classified as Component (E).

Regarding Component (E), dicyandiamide is suitably used from the viewpoint that a cured product having storage stability, adequate reactivity, and high toughness is obtainable.

Examples of commercially available products of dicyandiamide include DICY15 and DICY7 manufactured by Mitsubishi Chemical Corporation; and DYHARD 100M and 100S manufactured by AlzChem Group AG (Component (F))

Component (F) is an optional component.

Examples of Component (F) include a thermoplastic resin and known additives (a packing material, a diluent, a solvent, a pigment, a plasticizer, an oxidation inhibitor, a stabilizer, and the like).

A thermoplastic resin imparts high toughness to a cured product of an epoxy resin composition, and also has an effect of suppressing stickiness of the epoxy resin composition, regulating the tack of the prepreg to an appropriate level, or suppressing resin flow at high temperature.

Examples of the thermoplastic resin include a phenoxy resin, a polyvinyl formal, and a polyether sulfone.

Examples of the pigment include carbon black.

Carbon black has an effect of coloring an epoxy resin black, masking the color tone of the resin when the resin composition is molded into the fiber-reinforced composite material that will be described below, and thus imparting a satisfactory appearance.

Examples of the stabilizer for imidazole include an epoxy-phenol-boric acid ester compound.

(Composition)

The content of Component (A) is preferably 25% to 90% by mass, and more preferably 30% to 85% by mass, with respect to the total mass of all the epoxy resins included in the epoxy resin composition (that is, a total amount of 100% by mass of Component (A), Component (B), and Component (D)). When the content of Component (A) is 25% by mass or more, the cured product of the epoxy resin composition acquires increased heat resistance. Meanwhile, when the content of Component (A) is 90% by mass or less, the reactivity at 150° C. of the epoxy resin composition can be maintained satisfactorily.

The content of Component (B) is preferably 10% to 75% by mass, and more preferably 15% to 70% by mass, with respect to the total mass of all the epoxy resins included in the epoxy resin composition (that is, a total amount of 100% by mass of Component (A), Component (B), and Component (D)). When the content of Component (B) is 10% by mass or more, the reactivity at 150° C. of the epoxy resin composition can be maintained satisfactorily. Meanwhile, when the content of Component (B) is 75% by mass or less, the heat resistance of the epoxy resin composition can be maintained satisfactorily.

The content of Component (C) is preferably 3 to 10 parts by mass, and more preferably 3.5 to 7 parts by mass, with respect to 100 parts by mass of all the epoxy resins included in the epoxy resin composition (that is, total amount of component (A), Component (B), and Component (D)). When the content of Component (C) is 3 parts by mass or more, impartation of reactivity to the epoxy resin composition and heat resistance to the cured product can be achieved sufficiently. Meanwhile, when the content of Component (C) is 10 parts by mass or less, toughness of the cured product of the epoxy resin composition can be maintained more satisfactorily.

The content of Component (D) is preferably 0% to 15% by mass, and more preferably 0% to 10% by mass, with respect to the total mass of all the epoxy resins included in the epoxy resin composition (that is, a total amount of 100% by mass of Component (A), Component (B), and Component (D)). When the content of Component (D) is 15% by mass or less, sufficient heat resistance can be imparted to the cured product of the epoxy resin composition.

The content of Component (E) is preferably 4 to 9 parts by mass, and more preferably 5 to 7 parts by mass, with respect to 100 parts by mass of all the epoxy resins included in the epoxy resin composition (that is, the total amount of Component (A), Component (B), and Component (D)). When the content of Component (E) is 4 parts by mass or more, the epoxy resin can be sufficiently cured. Meanwhile, when the content of Component (E) is 9 parts by mass or less, a phenomenon of whitening of the cured product caused by contact between unreacted curing agent and moisture can be suppressed.

(Viscosity)

The viscosity at 30° C. of the epoxy resin composition is preferably 10,000 Pa·s or greater, more preferably 15,000 to 100,000 Pa·s, and even more preferably 20,000 to 70,000 Pa·s. When the viscosity at 30° C. of the epoxy resin composition is 10,000 Pa·s or greater, the resulting prepreg can have sufficient tack. When the viscosity at 30° C. of the epoxy resin composition is 100,000 Pa·s or less, the resulting prepreg can have sufficient drape properties.

(Half-Value Width of Reaction Exotherm)

The half-value width of the heat flow (Heat Flow) based on differential scanning calorimetric measurement is preferably 18° C. or lower, and more preferably 3° C. to 12° C. When the half-value width of the reaction exotherm is 18° C. or lower, the rapid curability of the epoxy resin composition and the heat resistance of the cured product become superior.

(Cured Product)

The glass transition point based on dynamic viscoelasticity measurement of a cured product obtained by heating the epoxy resin composition for 30 minutes at 150° C. is preferably 180° C. or higher, more preferably 185° C. or higher, and even more preferably 190° C. or higher. Specifically, the glass transition point is preferably 180° C. to 240° C., and more preferably 185° C. to 230° C. When the glass transition point of the cured product is 180° C. or higher, the cured product has sufficient heat resistance for aircraft applications, automobile applications, and bicycle applications.

The cure degree based on differential scanning calorimetric measurement of a cured product obtainable by heating the epoxy resin composition for 30 minutes at 150° C. is preferably 94% or higher, and more preferably 95% to 100%. When the cure degree is 94%, a prepreg containing the epoxy resin composition sufficiently acquires a property of being cured to hardness to the extent of being capable of demolding (primary curability), by heating at a relatively low temperature of 150° C. for a relatively short time.

(Operational Effects)

Since the epoxy resin composition of the present invention described above includes the particular Component (A), Component (B), and Component (C) described above, the epoxy resin composition has low-temperature high-speed curability. Specifically, a prepreg containing the epoxy resin composition has a property of being cured to hardness to the extent of being capable of demolding (primary curability), by heating at 150° C. for 30 minutes or less.

Furthermore, the epoxy resin composition of the present invention has a long pot life. Specifically, the epoxy resin composition has a pot life of four weeks or longer at 21° C. More specifically, it is preferable that the epoxy resin composition has a pot life of 4 to 24 weeks at 21° C.

Furthermore, the epoxy resin composition gives a cured product having excellent heat resistance and mechanical characteristics. In regard to heat resistance, for example, the cured product may have a glass transition point of 180° C. or higher as a result of post-curing for 30 minutes at 150° C.

<Prepreg for Fiber-reinforced Composite Material>

The prepreg for a fiber-reinforced composite material of the present invention includes the epoxy resin composition of the present invention and reinforcing fibers.

Examples of the reinforcing fibers include carbon fibers, aramid fibers, nylon fibers, high-strength polyester fibers, glass fibers, boron fibers, alumina fibers, and silicon nitride fibers. Among these, from the viewpoint of having excellent flame retardancy, carbon fibers, aramid fibers, glass fibers, boron fibers, alumina fibers, and silicon nitride fibers are preferred, and from the viewpoint of having excellent specific strength and specific elasticity, carbon fibers are particularly preferred.

Examples of the form of the reinforcing fibers include unidirectionally aligned fibers, a woven fabric, and a non-crimp fabric.

The percentage content of the epoxy resin composition is preferably 15% to 55% by mass, and more preferably 20% to 50% by mass, with respect to the total mass of the prepreg for a fiber-reinforced composite material.

The prepreg for a fiber-reinforced composite material of the present invention can be produced by a known method or the like, using the epoxy resin composition of the present invention and reinforcing fibers. Meanwhile, the curing temperature (primary curing temperature) for the prepreg for a fiber-reinforced composite material is 140° C. to 160° C.

In regard to the prepreg for a fiber-reinforced composite material of the present invention described above, since the prepreg contains the epoxy resin composition of the present invention, the prepreg has a long shelf-life despite having primary curability by which the epoxy resin composition is cured to hardness to the extent of being capable of demolding even if the prepreg is cured at a relatively low temperature for a short time, and the fiber-reinforced composite material obtainable after molding has excellent heat resistance and mechanical characteristics. For example, the prepreg acquires a property of being cured to hardness to the extent of being capable of demolding (primary curability), by heating for 30 minutes at 150° C. and has a shelf-life of four weeks or longer at 21° C., and as a result of post-curing for 30 minutes at 150° C., the cured product (matrix resin) can have a glass transition point of 180° C. or higher.

The prepreg for a fiber-reinforced composite material of the present invention can be subjected to primary curing in a lower temperature region compared to conventional prepregs, and the cost for energy, the cost for subsidiary materials, and the like required for molding can be reduced to a large extent.

<Fiber-reinforced Composite Material>

The fiber-reinforced composite material according to the present invention is obtained by curing the prepreg for a fiber-reinforced composite material of the present invention.

The fiber-reinforced composite material according to the present invention can be produced by a known method using the prepreg for a fiber-reinforced composite material of the present invention. For example, a method of sandwiching the prepreg between a lower mold and an upper mold, both have a predetermined surface shape, compressing and heating the prepreg, and thus obtaining a cured product having a predetermined shape, may be used. The heating temperature is preferably 140° C. to 160° C.

Since the fiber-reinforced composite material according to the present invention is formed by curing the prepreg for a fiber-reinforced composite material of the present invention, the fiber-reinforced composite material has excellent heat resistance and mechanical characteristics.

The epoxy resin composition of the present invention is preferably such that Component (A) is at least one epoxy resin selected from the group consisting of tris(hydroxyphenyl)methane triglycidyl ether, tetraglycidyl diaminodiphenylmethane, and triglycidyl p-aminophenol; Component (B) is at least one epoxy resin selected from the group consisting of a reaction product between bisphenol A diglycidyl ether and 4,4'-diaminodiphenylsulfone, and bisphenol S diglycidyl ether; and Component (C) is at least one selected from the group consisting of 2-phenyl-4,5-dihydroxymethylimidazole and 2-phenyl-4-methyl-5-hydroxymethylimidazole.

EXAMPLES

Hereinafter, the present invention will be specifically described by way of Examples; however, the present invention is not intended to be limited to these.

<Various Components>

(Component (A))

The compounds described below were used as Component (A).

A-1: Tris(hydroxyphenyl)methane triglycidyl ether (manufactured by Huntsman Advanced Materials LLC, trade name: TACTIX (registered trademark) 742).

A-2: Tetraglycidyl diaminodiphenylmethane (manufactured by Mitsubishi Chemical Corporation, trade name: jER (registered trademark) 604).

A-3: Triglycidyl p-aminophenol (manufactured by Huntsman Advanced Materials LLC, trade name: ARALDITE (registered trademark) MY0510)

(Component (B))

B-1: Reaction product obtained by mixing bisphenol A diglycidyl ether with 4,4'-diaminodiphenylsulfone (manufactured by SEIKA CORPORATION., trade name: SEIKACURE S) at a mass ratio of 100/9 at room temperature, and then mixing and heating the mixture at 150° C. (epoxy equivalent 266 g/eq).

B-2: Bisphenol S diglycidyl ether (manufactured by DIC CORPORATION, trade name: EXA-1514)

(Component (C))

The compounds described below were used as Component (C).

C-1: 2-Phenyl-4,5-dihydroxymethylimidazole (manufactured by SHIKOKU CHEMICALS CORPORATION, trade name: 2PHZ-PW).

C-2: 2-Phenyl-4-methyl-5-hydroxymethylimidazole (manufactured by SHIKOKU CHEMICALS CORPORATION, trade name: 2P4MHZ-PW).

C-3: 2,4-Diamino-6-[2'-methylimidazole-(1')]-ethyl-s-triazine (manufactured by SHIKOKU CHEMICALS CORPORATION, trade name: 2MZA-PW).

C-4: 2,4-Diamino-6-[2'-methylimidazole-(1')]-ethyl-s-triazine isocyanuric acid adduct (manufactured by SHIKOKU CHEMICALS CORPORATION, trade name: 2MA-OK-PW).

C-5: Microencapsulated imidazole (manufactured by Asahi Kasei E-materials Corporation, trade name: HX3742).

(Component (D))

The compound described below was used as Component (D).

D-1: Bisphenol A type epoxy resin (manufactured by Mitsubishi Chemical Corporation, trade name: jER (registered trademark) 828).

(Component (E))

The compound described below was used as Component (E).

E-1: Dicyandiamide (manufactured by Mitsubishi Chemical Corporation, trade name: DICY15).

(Component (F))

The compounds described below were used as Component (F).

F-1: Polyether sulfone (manufactured by BASF SE, trade name: ULTRASON E2020P-SR).

F-2: Carbon black (manufactured by Dainichiseika Color & Chemical Manufacturing Co., Ltd., trade name: ET795).

F-3: Epoxy-phenol-boric acid ester compound (manufactured by SHIKOKU CHEMICALS CORPORATION, trade name: L-07N).

<Measurement and Evaluation>

(Production of Resin Plate)

An epoxy resin composition was injected between two sheets of release-treated glass plates each having a thickness of 4 mm, with a spacer made of polytetrafluoroethylene (PTFE) and having a thickness of 2 mm interposed between the glass plates. The epoxy resin composition was heated for 30 minutes at 150° C., and thus a cured resin plate was obtained. This was used as a resin plate for the evaluation of the cure degree, bending characteristics, and glass transition point.

(Measurement of Cure Degree)

1 to 10 mg of resin pieces were collected from the cured resin plate, the resin pieces were heated up to 300° C. at a heating rate of 10° C./min using a differential scanning calorimeter (manufactured by TA Instruments, Q100), and the residual heating value was measured. The cure degree was determined by the following Formula (I) from the heating value thus measured.

Cure degree [%]=(Total heating value [J/g] of resin before curing−residual heating value [J/g])/total heaving value [J/g] of resin before curing×100  (I)

(Measurement of Cure Heating Value)

10 g of an epoxy resin composition was weighed in a cup made of aluminum and having a diameter of 50 mm, the epoxy resin composition was heated in an air heating furnace (manufactured by Kusumoto Chemicals, Ltd., "ETAC HT-310S") under the following conditions, and the temperature elevation DSC was measured. Thus, the total heating value was determined.

Conditions for temperature elevation: Temperature elevated from room temperature to the curing temperature (100° C.) at a rate of 2° C./min Curing conditions: Maintained for 2 hours at 100° C.

Conditions for temperature lowering: Natural cooling from the curing temperature to 50° C. or lower DSC analyzer: Q-1000 (manufactured by TA Instruments)

Temperature elevation rate: 10° C./min (Measurement of Half-Value Width of Reaction Exotherm)

The heating value was measured using a differential scanning calorimeter (manufactured by TA Instruments, Q100), and the width in the X-axis direction (° C.) of the reaction exotherm peak at a position equivalent to a half of the peak height was measured as the half-value width of the reaction exotherm.

(Evaluation of Bending Characteristics)

A specimen having a size of length: 60 mm, width: 8 mm, and thickness: 2 mm was cut out from the cured resin plate. The bending characteristics (bending strength, flexural modulus, and bending elongation) were measured using a universal tester (manufactured by Instron Corp.) equipped with a three-point bending fixture (indent and supports together 3.2 mmR, distance between supports: 16 times the thickness of the specimen, crosshead speed: 2 mm/min).

(Measurement of Glass Transition Point)

A specimen having a size of length: 55 nim, width: 12.7 mm, thickness: 2 mm was cut out from the cured resin plate. The storage modulus E' was measured in the bending mode according to ASTM D 7028 using a dynamic viscoelasticity analyzer (manufactured by TA Instruments, "DMA-Q800") under the conditions of frequency: 1 Hz and heating rate: 5° C./min. The values of log E' were plotted against temperature, and the temperature at an intersection point between the tangent line to a flat region before the transition of log E and the tangent line at the inflection point of the region of transition of log E' was designated as the glass transition point.

(Evaluation of Pot Life)

The glass transition point of an epoxy resin composition was measured using a differential scanning calorimeter (manufactured by TA Instruments, "Q100"). This was designated as initial glass transition point.

Next, the epoxy resin composition was stored in an environment at 21° C. and 50 RH %, and 1 to 10 mg of samples were collected therefrom, and the glass transition point of the epoxy resin composition was measured at a frequency of once a week using a differential scanning calorimeter (manufactured by TA Instruments, "Q100"). The week during which the glass transition point exceeded the temperature of (initial glass transition+10° C.) was considered as the expiration of the pot life.

Example 1

Component (A) and F-1 were measured at the composition of Table 1 in a glass flask and were melted and mixed at 140° C. Thus, a master batch was prepared.

The master batch thus obtained and Component (B) were stirred and mixed at the composition of Table 1 at 100° C. This was slowly cooled to 60° C., and Component (C), Component (D), Component (E), and the remaining Component (F) were added thereto in the amounts indicated in Table 1. The mixture was stirred and mixed until the mixture became uniform, and then the mixture was subjected to degassing in a vacuum. Thus, an epoxy resin composition was obtained.

Various measurements and evaluations were carried out using the epoxy resin composition thus obtained. The results are presented in Table 1.

Examples 2 to 10

Epoxy resin compositions were prepared in the same manner as in Example 1, except that the respective amounts of the components were changed to the amounts indicated in Table 1, and the measurements and evaluations were respectively carried out. The results are presented in Table 1.

Comparative Examples 1 to 3

Epoxy resin compositions were prepared in the same manner as in Example 1, except that the respective amounts of the components were changed to the amounts indicated in Table 2, and the measurements and evaluations were respectively carried out. The results are presented in Table 2.

As is obvious from the results of Table 1, the respective epoxy resin compositions obtained in the Examples had long pot lives despite having low-temperature high-speed curability, and the cured products had excellent heat resistance and mechanical characteristics.

Meanwhile, as is obvious from the results of Table 2, the epoxy resin compositions of Comparative Examples 1 and 2, in which 2,4-diamino-6-[2'-methylimidazole-(1')]-ethyl-s-triazine only was used as Component (C), had a 21° C. pot life of less than one week. Furthermore, the half-value width of the reaction exotherm was 22° C. or higher.

The epoxy resin composition of Comparative Example 3, in which 2,4-diamino-6-[2'-methylimidazole-(1')]-ethyl-s-triazine isocyanuric acid adduct only was used as Component (C), had a glass transition point of 176° C., which is in a low range.

INDUSTRIAL APPLICABILITY

A fiber-reinforced composite material obtainable using the epoxy resin composition of the present invention is suitably used for aircraft members, automobile members,

TABLE 1

| Composition [parts by mass] | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Component (A) | A-1 | 10 | 23 | 25 | 25 | 10 | 25 | 35 | 0 | 10 | 0 |
| | A-2 | 25 | 9 | 10 | 10 | 25 | 10 | 35 | 15 | 25 | 20 |
| | A-3 | 0 | 0 | 0 | 0 | 0 | 0 | 0 | 15 | 0 | 0 |
| Component (B) | B-1 | 65 | 60 | 65 | 65 | 65 | 65 | 30 | 70 | 0 | 80 |
| | B-2 | 0 | 0 | 0 | 0 | 0 | 0 | 0 | 0 | 65 | 0 |
| Component (C) | C-1 | 5 | 5 | 5 | 0 | 2.5 | 5 | 5 | 5 | 5 | 5 |
| | C-2 | 0 | 0 | 0 | 5 | 0 | 0 | 0 | 0 | 0 | 0 |
| | C-3 | 0 | 0 | 0 | 0 | 0 | 0 | 0 | 0 | 0 | 0 |
| | C-4 | 0 | 0 | 0 | 0 | 0 | 0 | 0 | 0 | 0 | 0 |
| | C-5 | 0 | 0 | 0 | 0 | 0 | 4 | 0 | 0 | 0 | 0 |
| Component (D) | D-1 | 0 | 8 | 0 | 0 | 0 | 0 | 0 | 0 | 0 | 0 |
| Component (E) | E-1 | 5.6 | 5.4 | 5.6 | 5.6 | 5.6 | 5.6 | 5.6 | 4.6 | 5.6 | 5.6 |
| Component (F) | F-1 | 5 | 0 | 0 | 5 | 0 | 5 | 0 | 8 | 5 | 5 |
| | F-2 | 0.1 | 0.1 | 0.1 | 0.1 | 0.1 | 0.1 | 0.1 | 0.1 | 0.1 | 0.1 |
| | F-3 | 0 | 0 | 0 | 4 | 0 | 0 | 0 | 0 | 0 | 0 |
| Cure degree [%] | | 95.3 | 95.2 | 96.0 | 95.8 | 96.0 | 94.6 | 94.9 | 94.2 | 94.1 | 96.7 |
| Cure heating value [J/g] | | 423 | 430 | 461 | 417 | 436.9 | 464.5 | 432.2 | 448.2 | 408.2 | 456.5 |
| Half-value width of reaction exotherm [° C.] | | 9 | 7 | 5 | 7 | 9 | 8 | 17 | 6 | 7 | 8 |
| Bending strength [MPa] | | 166 | 137 | 129 | 141 | 172 | 153 | 154 | 124 | 152 | 129 |
| Flexural modulus [GPa] | | 3.56 | 3.30 | 3.33 | 3.13 | 3.45 | 3.37 | 3.47 | 3.67 | 3.31 | 3.24 |
| Bending elongation [%] | | 7.44 | 5.27 | 4.99 | 7.64 | 7.45 | 8.54 | 6.08 | 4.23 | 6.21 | 4.63 |
| Glass transition point [° C.] | | 193 | 197 | 192 | 182 | 182 | 180 | 190 | 202 | 220 | 178 |
| 21° C. pot life [weeks] | | >4 | >4 | >4 | >4 | >4 | >4 | >4 | >4 | >4 | >4 |

TABLE 2

| Composition [parts by mass] | | Comparative Example 1 | Comparative Example 2 | Comparative Example 3 |
|---|---|---|---|---|
| Component (A) | A-1 | 0 | 23 | 9 |
| | A-2 | 15 | 9 | 23 |
| | A-3 | 10 | 0 | 0 |
| Component (B) | B-1 | 65 | 60 | 60 |
| | B-2 | 0 | 0 | 0 |
| Component (C) | C-1 | 0 | 0 | 0 |
| | C-2 | 0 | 0 | 0 |
| | C-3 | 5 | 5 | 0 |
| | C-4 | 0 | 0 | 5 |
| | C-5 | 0 | 0 | 0 |
| Component (D) | D-1 | 10 | 8 | 8 |
| Component (E) | E-1 | 4.6 | 5.4 | 5.4 |
| Component (F) | F-1 | 6 | 0 | 0 |
| | F-2 | 0.1 | 0.1 | 0.1 |
| | F-3 | 0 | 0 | 0 |
| Cure degree [%] | | 96.9 | 96.6 | 97.0 |
| Cure heating value [J/g] | | 423 | 464 | 440 |
| Half-value width of reaction exotherm [° C.] | | 25 | 22 | 15 |
| Bending strength [MPa] | | 131 | 152 | 170 |
| Flexural modulus [GPa] | | 3.32 | 3.66 | 3.56 |
| Bending elongation [%] | | 4.77 | 6.62 | 7.61 |
| Glass transition point [° C.] | | 187 | 184 | 176 |
| 21° C. pot life [weeks] | | 1 | 0 | >4 | bicycle members, sports goods members, railway vehicle members, ship members, construction members, oil risers, and the like. In particular, the fiber-reinforced composite material is suitably used for aircraft members, automobile members, and bicycle members, where high heat resistance and strength characteristics are required.

The invention claimed is:

1. An epoxy resin composition, comprising:
   (A) at least one epoxy resin having at least three glycidyl groups;
   (B) at least one epoxy resin having at least one sulfur atom;
   (C) at least one of 2-phenyl-4,5-dihydroxymethylimidazole represented by the following Formula (1) and 2-phenyl-4-methyl-5-hydroxymethylimidazole represented by the following Formula (2);
   (D) at least one selected from the group consisting of a bisphenol A diglycidyl ether, a bisphenol F diglycidyl ether and a monofunctional epoxy resin, in a positive amount of up to 15% by mass with respect to a total mass of all epoxy resins included in the epoxy resin composition; and
   (E) dicyandiamide:

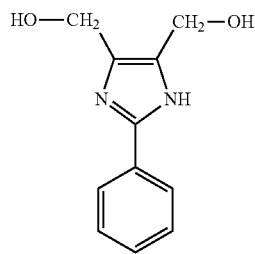

(1)

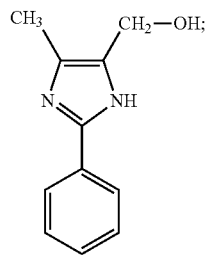

(2)

wherein (A) does not include an epoxy resin having at least one sulfur atom.

2. The epoxy resin composition according to claim 1, wherein (B) comprises a reaction product between an epoxy resin and an amine compound having at least one sulfur atom.

3. The epoxy resin composition according to claim 1, wherein the content of (A) is 25% to 85% by mass, and the content of (B) is 10% to 70% by mass, with respect to the total mass of all the epoxy resins included in the epoxy resin composition.

4. The epoxy resin composition according to claim 1, comprising 2-phenyl-4,5-dihydroxymethylimidazole as (C).

5. The epoxy resin composition according to claim 1, wherein the epoxy resin composition has a pot life upon storage at 21° C. of four weeks or longer.

6. The epoxy resin composition according to claim 1, wherein a half-value width of a reaction exotherm based on differential scanning calorimetric measurement of the epoxy resin composition is 18° C. or less.

7. The epoxy resin composition according to claim 1, wherein a cure degree based on differential scanning calorimetric measurement of a cured product obtainable by heating the epoxy resin composition for 30 minutes at 150° C. is 94% or higher.

8. The epoxy resin composition according to claim 1, wherein (A) includes at least one selected from the group consisting of a tetraglycidylamine epoxy resin, a triglycidylaminophenol epoxy resin, a triglycidyl ether epoxy resin, a phenol novolac epoxy resin, a cresol-novolac epoxy resin, and a polyfunctional novolac epoxy resin.

9. The epoxy resin composition according to claim 1, wherein (A) includes tris(hydroxyphenyl)methane triglycidyl ether.

10. The epoxy resin composition according to claim 1, wherein (A) includes at least one selected from the group consisting of tris(hydroxyphenyl)methane triglycidyl ether, tetraglycidyl diaminodiphenyl methane, and triglycidyl p-aminophenol.

11. The epoxy resin composition according to claim 1, wherein (A) includes at least one selected from the group consisting of tris(hydroxyphenyl)methane triglycidyl ether and tetraglycidyl diaminodiphenyl methane.

12. The epoxy resin composition according to claim 1, wherein (A) includes at least one selected from the group consisting of tetraglycidyl diaminodiphenyl methane and triglycidyl p-aminophenol.

13. The epoxy resin composition according to claim 1, further comprising carbon black.

14. The epoxy resin composition according to claim 1, wherein a glass transition point of a cured product obtained by heating the epoxy resin composition for 30 minutes at 150° C. is 180° C. or higher, where the glass transition point is determined by a dynamic viscoelasticity measurement.

15. The epoxy resin composition according to claim 14, wherein the glass transition point is 185° C. or higher.

16. The epoxy resin composition according to claim 14, wherein the glass transition point is 190° C. or higher.

17. A cured product obtained by heating the epoxy resin composition of claim 1 for 30 min at 150° C. and having a glass transition point of 180° C. or higher, wherein the glass transition point is determined by a dynamic viscoelasticity measurement.

18. A prepreg for a fiber-reinforced composite material, comprising the epoxy resin composition according to claim 1 and reinforcing fibers.

19. A fiber-reinforced composite material, obtained by curing the prepreg for a fiber-reinforced composite material according to claim 18.

* * * * *